April 19, 1960   A. N. GRAY   2,933,175
SCREW-CONVEYOR SYSTEMS
Filed Oct. 29, 1958   2 Sheets-Sheet 1
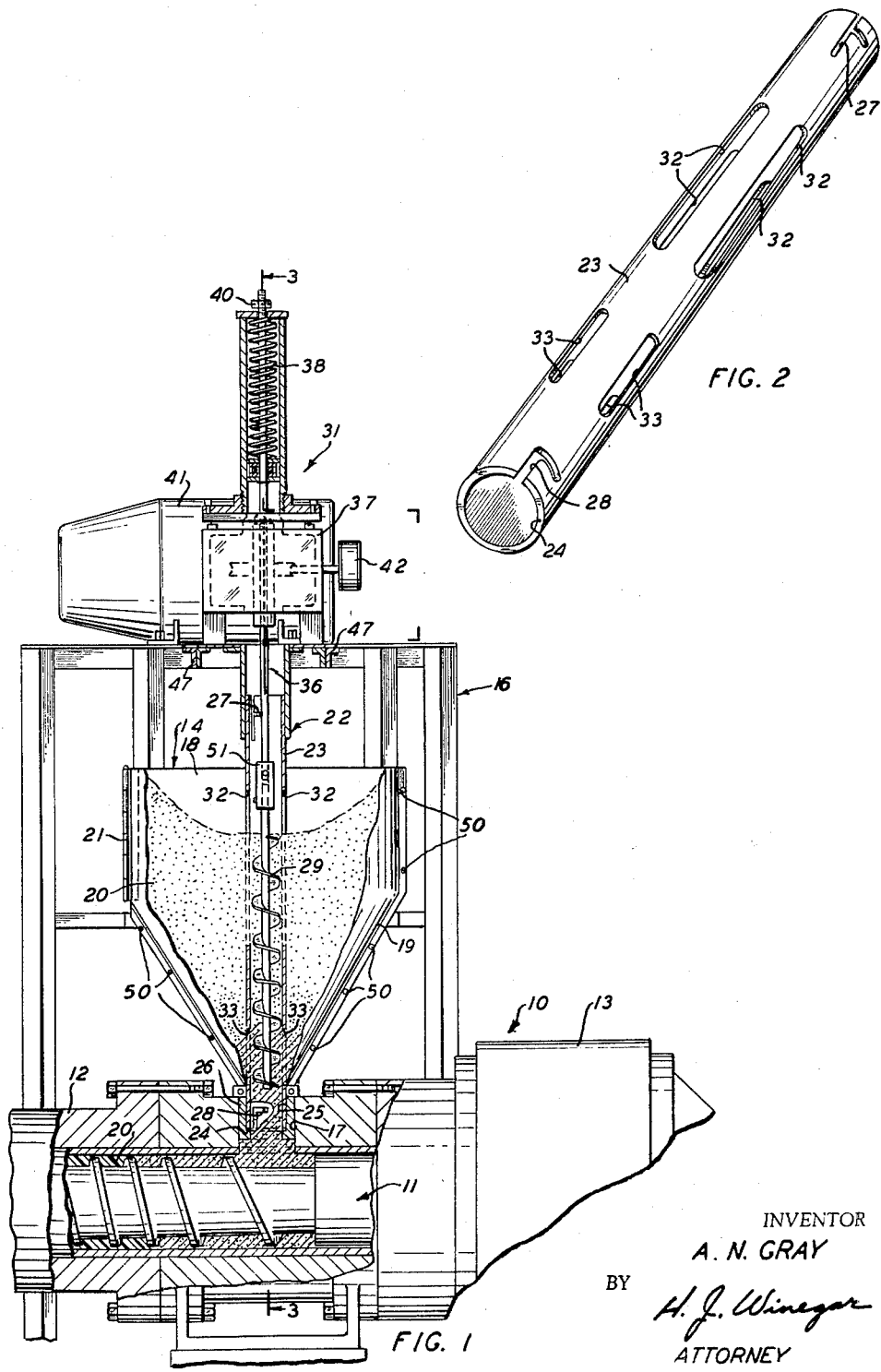
INVENTOR
A. N. GRAY
BY
H. J. Winegar
ATTORNEY United States Patent Office 2,933,175
Patented Apr. 19, 1960

2,933,175

SCREW-CONVEYOR SYSTEMS

Alvin N. Gray, Edgewood, Md., assignor to Western Electric Company, Incorporated, New York, N.Y., a corporation of New York Application October 29, 1958, Serial No. 770,387

3 Claims. (Cl. 198—64)

The invention relates to screw-conveyor systems, and more particularly, although not exclusively, to a screw conveyor in which the screw thereof is moved longitudinally automatically, by reactive forces which are in excess of a predetermined amount set up in the material being conveyed which resist the rotation of the screw.

In extruding apparatus it is common to utilize screw-type conveyors to stuff the extruder screw which forces plastic or thermoplastic material through an extruder cylinder and into an extruder head. If for some reason the extruder screw stops or the material being forced from the end of the conveyor stops or the movement of the material from the end of the conveyor is resisted by a force in excess of a predetermined amount, the means driving the conveyor must slip, be slowed down or be stopped to prevent damage to the conveyor or drive means.

Often, the means for driving the conveyor is provided with a slipping drive such as a slipping belt or clutch. Slipping belts or clutches are relatively expensive and require an excessive amount of maintenance. Therefore, it has been found desirable to eliminate such belts, clutches or other means which are used to prevent the conveyor screw from being rotated by the drive means.

It is an object of the present invention to provide new and improved screw-conveyor systems.

Another object of the present invention is to eliminate the necessity for providing a slipping belt, clutch or other means in the drive system of a screw conveyor to prevent excessive torsional forces from being applied to the screw of the conveyor when free movement of a material being conveyed from the exit end of the conveyor is restricted by a predetermined amount.

A further object of the present invention is to provide a screw-conveyor system which is biased and will be moved in the direction from which the material is being conveyed to permit free movement of the material from the conveyor other than at the exit end thereof when more than a predetermined amount of force would be required to urge the material out of the exit end of the conveyor.

A still further object of the present invention is to provide a stuffer conveyor which will maintain a predetermined amount of force on the material being removed from the exit end thereof by an extruder screw regardless of the rate of flow of material therefrom.

In accordance with these and other objects a screw-conveyor system for feeding particulate material may include a feed hopper for containing a supply of particulate material, an apertured housing for receiving material from the hopper positioned at least partially within the hopper. The housing may have a main exit opening for discharging material externally of the feed hopper and at least one aperture which serves at least in part as an auxiliary exit for the material. A screw is mounted slidably and rotatably within the housing and is secured to drive means for rotating the screw to force the material through the housing toward the main exit opening. Means are provided for yieldably urging the screw longitudinally toward the main exit opening while permitting the screw to move away from the main exit opening whenever the force exerted on the material by the screw tends to exceed a predetermined amount. The movement of the screw away from the main exit opening causes an increase in the auxiliary exit of the material from the housing through the aperture so as to maintain uniform force on the material being urged from the main exit opening of the housing.

Other objects and features of the present invention will be more readily understood from the following detailed description of a specific embodiment thereof when read in conjunction with the appended drawings in which:

Fig. 1 is a fragmentary, side elevational view of an extruding apparatus embodying certain features of the present invention with portions thereof broken away for purposes of clarity;

Fig. 2 is an enlarged, perspective view of a slotted conveyor housing forming part of the apparatus illustrated in Fig. 1.

Figure 3:
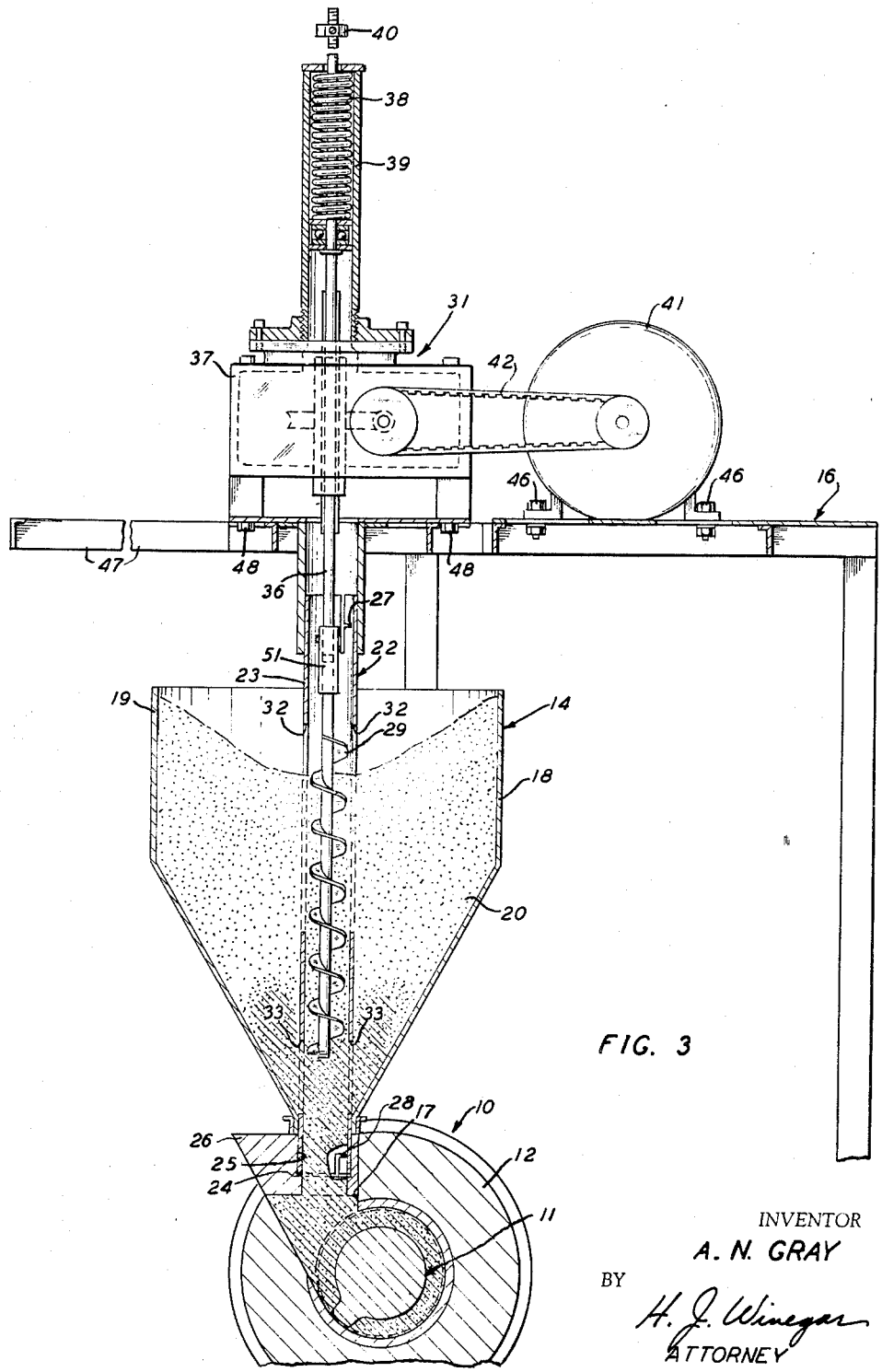
Fig. 3 is an enlarged, fragmentary, vertical section taken along line 3—3 of Fig. 1 with the conveyor screw shown in an elevated position.

Referring now to the drawings and particularly to Fig. 1 thereof, there is shown a pictorial representation of a conventional extruder, designated generally by the numeral 10, having an Archimedean-type, extruder screw 11. The extruder 10 includes a conventional extruder head (not shown) through which a core (not shown) may be passed to extrude an insulating jacket thereon. The jacket may be formed from thermoplastic material 20 (e.g. polyethylene, polyvinyl chloride or the like) which is forced through the extruder head by the screw 11 mounted rotatably in a lined extruder cylinder 12. The screw 11 is rotated in a counterclockwise direction as viewed in Fig. 3 by appropriate means such as an electrical motor (not shown) connected thereto through a conventional gear reducer 13.

A supply hopper, designated generally by the numeral 14, having a substantially cylindrical upper portion and a substantially frustoconical lower portion, is supported by a framework, designated generally by the numeral 16, so that the lower end thereof is positioned in an aperture 17 adjacent to the top and on one side of the extruder cylinder 12. The hopper 14 serves as a source of supply of finely divided, granulated, thermoplastic or otherwise extrudable material 20 for the extruding screw 11 and is constructed of two halves 18 and 19. One half 18 of the hopper 14 is secured vertically adjustably to the framework 16 and the other half 19 is pivotable on a hinge 21 to permit insertion and removal of a stuffer-screw assembly, designated generally by the numeral 22.

The stuffer-screw assembly 22 is provided with a cylindrical housing 23 which depends from the framework 16 centrally of the hopper 14 so that the exit end 24 thereof extends into a counterbored aperture 25 in a wedge-shaped adapter 26 positioned in the aperture 17 of the extruder cylinder 12. The cylindrical housing 23 is supported removably and adjustably on bayonet type mountings 27 and 28 at opposite ends thereof. A conventional Archimedean-type conveyor screw 29 is positioned within the housing 23 and is driven rotatably by a drive system, designated generally by the numeral 31. A plurality of slots 32—32 are provided in the housing 23 to permit the entrance of granulated, plastic material 20 into the entrance end of the stuffer-screw assembly 22. Also, a plurality of slots 33—33 are provided in the housing 23 which serve as auxiliary outlets to permit the material 20 to be forced from the housing 23 by the stuffer screw 29 in the event that the screw 29 is being operated so that the amount of material 20 being urged toward the exit end 24 of the stuffer assembly 22 is in excess of that being removed by the extruder screw 11, which is desirable.

The stuffer screw 29 is coupled to a splined shaft 36 which is mounted slidably and rotatably in and extending through a conventional gear reducer 37. The shaft 36 is biased by a compression spring 38 mounted coaxially thereon in a tubular, spring housing 39 secured to and projecting above the gear reducer 37. The spring 38 is preferably of a design having a characteristic so that the force necessary to compress the spring will remain constant as the ends of the spring are moved toward each other. A nut-like stop 40 is placed on a threaded upper end of the shaft 36 which will engage the spring housing 39 to prevent the screw 29 from interfering with the screw 11. The gear reducer 37 is driven by a suitable electric motor 41 through a nonslipping toothed belt 42.

The compression spring 38 is utilized to urge the stuffer screw 29 toward the extruder screw 11 so that the stuffer screw will always urge the material 20 into the extruder cylinder 12 with a predetermined force. However, if for some reason the force required to urge the material 20 from the exit end 24 of the housing 23 is in excess of a predetermined amount, resulting from the weight of the screw 29 and the resiliency of the spring 38, the screw 29 will be forced upwardly in the housing 23 so that more of the material 20 is forced from the auxiliary outlets formed by the slots 33—33. This may result ultimately in all of the material 20 being moved by the screw 29 being forced out of the slots 33—33. In the event that the last-mentioned condition occurs, the stuffer assembly 22 will be still exerting a predetermined force on the material 20 between the end of the screw 29 and the entrance end of the extruder cylinder 12. Further, the stuffer screw 29 will at that time be circulating the granular plastic material 20 into the entrance end of the housing 23 through the housing 23, out the slots 33—33, through the hopper 14 and back to the entrance end of the housing 23.

*Operation*

In the operation of the apparatus described hereinabove, the extruder screw 11 is rotated in an extruder cylinder 12 by the electric motor (not shown) through the gear reducer 13. The extruder screw 11 works, compresses, conditions and forces the material 20 out of a die (not shown) in the extruder head (not shown) in a desired, predetermined, plastic state. The plastic material 20, to be extruded, is urged into the entrance end of the extruder cylinder 12 by the stuffer-screw assembly 22 with a predetermined force. The loose compound 20 in the hopper 14 enters the housing 23 through the slots 32—32 adjacent to the upper end of the stuffer screw 29. The stuffer screw 29 is rotated at a predetermined speed by the motor 41 through the belt 42 and the gear reducer 37. The stuffer screw 29 compresses the granular material 20 and carries it downwardly toward the extruder screw 11. The stuffer screw 29 tries to urge the granular material 20 into the extruder cylinder 12 at a predetermined volumetric rate and with a predetermined force.

It is desirable that the volumetric flow of material 20 in the housing 23 be in excess of that which will be conveyed away from the exit end of the stuffer assembly 22 by the extruder screw 11 to prevent the latter from being starved. The excessive granular material 20 being conveyed through the housing 23 by the screw 29 must, therefore, be allowed to pass from the housing 23 at some point other than at the exit end of the stuffer assembly 22. The excessive amount of granular material 20 is allowed to escape out openings 33—33 forming the auxiliary outlet near the lower end of the housing 23 and be recirculated through the hopper 14.

In the event that the rate at which the material 20 is being removed from the exit end of the stuffer screw 29 by the extruder screw 11 is diminished, a resultant increase in the force exerted by the stuffer screw 29 on the granular material 20 near the exit end 24 of the housing 23 would occur if some provision were not made to either allow the material 20 to pass from the housing 23 elsewhere or to reduce the rotational speed of the screw 29. However, the stuffer assembly 22 embodying certain features of the present invention includes a conveyor screw 29 which is allowed to move upwardly against the force of the compression spring 38 so that the material 20 escaping from the openings 33—33 in the housing 23 will be increased when the material 20 is being removed from the exit end of the housing 23 by the extruder screw 11 is decreased.

In the event that the extruder screw 11 stops or for some reason does not remove any of the material 20 from the exit end 24 of the stuffer-screw assembly 22, the stuffer screw 29 will be moved upwardly until the lower end thereof is higher than the lower portions of the auxiliary outlet openings 33—33. When this happens, all of the material 20 being moved by the stuffer screw 29 through the housing 23 will pass out the openings 33—33, near the lower extremity of the housing 23, and back into the hopper 14. When the rate at which the extruder screw 11 is removing the granular material 20 from the exit end of the stuffer assembly 22 is increased the stuffer screw 29 will be forced downwardly of the housing 23 by the compression spring 38 so that the rate at which the stuffer screw 29 is forcing the material 20 through the auxiliary openings 33—33 will decrease.

It may be desirable to remove the stuffer-screw assembly 22 from the hopper 14 to replace the screw 29 or housing 23, respectively, with a screw 29 having threads of a different pitch, or with a housing 23 having different sized or positioned slots 32—32 or 33—33 or even one in which the slots 32—32 and 33—33 are formed or interconnected to form one or a plurality of slots which may extend substantially the entire length of the housing 23. If that be so, the belt 42 may be removed by loosening bolts 46—46 which secure the base of the motor 41 to the framework 16 and by sliding the motor 41 toward the stuffer assembly 22. The gear reducer 37 and stuffer assembly 22 may be moved outwardly along a cantilever-type slideway 47, formed by the framework 16, by loosening studs 48—48 engaging threadedly the base of the gear reducer 37, disengaging fastening means such as screws 50—50, opening the pivotable half 19 of the hopper 14, rotating the housing 23 to disengage it from the bayonet connections 27 and 28 and raising the housing 23 and the screw 29 to an upward position so that the ends thereof will clear an upper surface of the adapter 26. After the gear reducer 37 and stuffer assembly 22 is moved forwardly of the apparatus along the slideway 47 the housing 23 may be moved downwardly and off the end of the screw 29. The screw 29 may be disengaged from the shaft 36 at a coupling 51. A different screw 29 or housing 23 may be inserted by reversing the above-described process.

Any of many obvious means or methods may be used to supplement or replenish the supply of granular, plastic material 20 in the hopper 14 for maintaining the amount of the material 20 adequate during normal operation of the apparatus. Well known control means (not shown) may be utilized to deenergize the motor 41 when the motor driving the extruder screw 11 is deenergized, or the stuffer screw 29 and the extruder screw 11 may be rotated by the same drive means.

It is to be understood that the grain structure or property of the material 20 being fed into the extruder 10 by means of the stuffer-screw assembly 22, embodying certain features of the present invention, is not important as long as it is in particulate form or will flow. Also, apparatus embodying certain features of the present invention need not be utilized as a stuffer-screw assembly for an extruder but could be used in most any screw-type conveyor system.

It is to be understood that the above-described arrangements are simply illustrative of the invention. Other arrangements may be devised by those skilled in the art which will embody the principles of the invention and fall within the spirit and scope thereof.

What is claimed is:

1. A screw-conveyor system for conveying particulate material, which comprises a feed hopper for containing a supply of particulate material and having at least one hinged section removable from the remaining portion of the hopper for permitting horizontal access thereto along substantially an entire vertical length thereof, a slideway projecting laterally of the feed hopper, a stuffer-screw assembly mounted slidably, substantially horizontally of the apparatus on the slideway for permitting removal of the assembly, the assembly including a housing at least partially within the hopper for receiving the material from the housing and having a main exit opening and at least one opening for a material inlet and an auxiliary outlet, a continuously rotating conveyor screw, means for driving the conveyor screw at a rate of speed such that the volumetric flow of the material being conveyed by the screw through the housing is in excess of that being forced from the main exit opening of the housing, and means for maintaining a predetermined force on the material being urged from the exit end of the housing and to permit the screw to move automatically, longitudinally of the conveyor as a result of excessive reactive force resisting the rotation of the screw when the exit opening of the conveyor becomes restricted.

2. A screw-conveyor system for conveying particulate material, which comprises a feed hopper for containing a supply of particulate material and having at least one hinged section removable from the remaining portion of the hopper for permitting horizontal access thereto along substantially an entire vertical length thereof, a slideway projecting laterally of the feed hopper, a stuffer-screw assembly mounted slidably, substantially horizontally of the apparatus on the slideway for permitting removal of the assembly, the assembly including a housing at least partially within the hopper for receiving material from the hopper and having a main exit opening and at least one opening serving at least in part as an auxiliary outlet for the material, a continuously rotating conveyor screw, means for driving the conveyor screw at a rate of speed such that the volumetric flow of the material being conveyed by the screw through the housing is in excess of that being forced from the main exit opening of the housing, and means for preventing excessive torsional forces from being applied to the screw while maintaining the force urging the material from the exit end of the housing at a predetermined level regardless of the rate at which the material is being removed from the exit opening of the housing.

3. A screw-conveyor system for conveying particulate material, which comprises a feed hopper for containing a supply of particulate material and having at least one hinged section removable from the remaining portion of the hopper for permitting horizontal access thereto along substantially an entire vertical length thereof, a cantilever-type slideway projecting laterally of the feed hopper, a stuffer-screw assembly mounted slidably, substantially horizontally of the apparatus on the slideway for permitting removal of the assembly, the assembly including a housing at least partially within the hopper for receiving the material from the hopper and having a main exit opening and at least one opening serving at least in part as an auxiliary outlet for the material from the housing, a continuously rotating conveyor screw, means for driving the conveyor screw at a rate of speed such that the volumetric flow of the material being conveyed by the screw through the housing is in excess of that being forced from the main exit opening of the housing, a splined shaft secured to the screw, a cylindrical spring housing encompassing a portion of the shaft and projecting upwardly from the drive means, a cap secured to the upper end of the housing, and a compression spring in the spring housing urging the splined shaft away from the cap and toward the main exit opening of the housing to maintain a predetermined force on the material being urged from the main exit opening regardless of the rate at which the material exits therefrom.

References Cited in the file of this patent

UNITED STATES PATENTS

| | | |
|---|---|---|
| 1,401,155 | Jacoby | Dec. 27, 1921 |
| 2,791,802 | Weber | May 14, 1957 |